United States Patent [19]
Mylari

[11] 3,882,115
[45] May 6, 1975

[54] PREPARATION OF 2-ARYL-AS-TRIAZINE-3,5 (2H,4H)-DIONES
[75] Inventor: Banavara L. Mylari, Waterford, Conn.
[73] Assignee: Pfizer Inc., New York, N.Y.
[22] Filed: June 25, 1973
[21] Appl. No.: 373,253

[52] U.S. Cl. ............................ 260/248 AS; 424/249
[51] Int. Cl. ............................................. C07d 55/10
[58] Field of Search ............................. 260/248 AS

[56] References Cited
UNITED STATES PATENTS
3,560,496    2/1971    Howes et al. ...................... 260/248

Primary Examiner—John M. Ford
Attorney, Agent, or Firm—Connolly and Hutz

[57] ABSTRACT

A process for the preparation of 2-aryl-as-triazine-3,5-(2H,4H)-diones via cyclodehydration of glyoxylic acid 2-arylsemicarbazones, said products being useful for controlling coccidiosis in poultry.

8 Claims, No Drawings

PREPARATION OF 2-ARYL-AS-TRIAZINE-3,5 (2H,4H)-DIONES

BACKGROUND OF THE INVENTION

This invention relates to a process for the preparation of 2-aryl-astriazine-3,5(2H,4H)-diones, a class of compounds having coccidiostatic activity.

In addition to the methods for the synthesis of 2-aryl-as-triazine-3,5(2H,4H)-diones outlined in "The Chemistry of Heterocyclic Compounds," Interscience Publishers, Inc., New York, N.Y., 1956, Vol. 10, Chapt. 2, this class of compounds has been prepared by decarboxylation of 2-aryl-6-carboxy-as-triazine-3,5(2H,4H)-diones by the method of Slouka, Ber., 96, 134 (1965).

SUMMARY OF THE INVENTION

It has now been discovered that the preparation of compounds of the formula

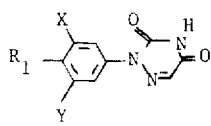

wherein X is hydrogen or methyl; Y is hydrogen, chloro or methyl and $R_1$ is hydrogen, 2-chlorophenoxy or 2-chloro-4-(N-methyl-N-ethylsulfamoyl)phenoxy, can be achieved by contacting a compound of the formula

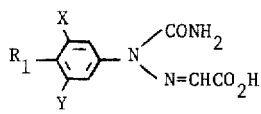

with an equimolar amount of an alkali metal salt of an alkanoic acid containing from 1 to 5 carbon atoms and an equimolar amount of an alkanoic acid anhydride containing from 4 to 8 carbon atoms at 75°–150° C.

The instant process differs from known methods for preparing 2-aryl-as-triazine-3,5(2H,4H)-diones in that it comprises cyclodehydration of glyoxylic acid 2-arylsemicarbazones under acidic conditions.

Of particular interest is the process of the present invention wherein the alkali metal salt of the alkanoic acid is sodium acetate and the alkanoic acid anhydride is acetic anhydride, and the variables X and Y are either each methyl, each hydrogen or X is methyl and Y is chloro.

DETAILED DESCRIPTION OF THE INVENTION

The aforementioned reaction is depicted in the following scheme

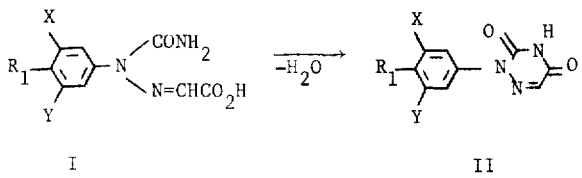

wherein $R_1$, X and Y are as previously defined.

Experimentally, compound I is contacted with at least equimolar amounts of an alkali metal salt of an alkanoic acid and an alkanoic acid anhydride. Upper limit amounts of these reagents are not critical, and it is preferred that an excess of both reagents be employed to obtain high yields. As much as a 100–200% excess of the salt can be employed and as much as a 100–500% excess of the anhydride, without markedly affecting the purity of the product. The excess of those reactants serves as a driving force which allows for good yields of said reaction products in a somewhat shorter period of time. Further, the order of combining these reagents is not critical as a factor influencing the success of the instantly claimed process.

Although the present process can be conducted neat, i.e., without the benefit of a solvent, it is preferred that a reaction-inert solvent be employed. Such solvents or combinations thereof are those which will, under the conditions of the instant process, not enter into appreciable reaction either with the starting reagents or product. It is preferred the solvents or combinations thereof to be employed consist of non-aqueous, aprotic solvents, although a small amount of water is tolerated without markedly affecting the yields or purity of the resulting product. Solvents which meet these requirements must also be capable of solubilizing the appropriate reactants, thus providing a single contact phase for process reactants. Such solvents include dimethylformamide, hexamethylphosphoramide, dimethylsulfoxide, dimethoxyethane and tetrahydrofuran. A preferred solvent for the claimed process comprises the use of an excess amount of one of the reactants, namely the alkanoic acid anhydride.

Reaction temperatures can vary, but a preferred range of 75–150° C. is adequate to complete the present process within a reasonable period of time. Experimentally, it is convenient to choose as a solvent an alkanoic acid anhydride which has a boiling point at or about the temperature necessary to carry out the cyclization. Reaction time is not critical and will vary depending on concentration of reactants, temperature, and inherent reactivity of the starting reagents. In general, when temperatures of 75°–150° C. are employed reaction time will vary from about 24 to 4 hrs., respectively.

The alkanoic acid anhydride starting reagents can be comprised of two identical alkanoic acids or may consist of a mixed anhydride wherein two different alkanoic acids comprise the anhydride. Further, in addition to the alkali metal salts of an alkanoic acid, there is also contemplated within the scope of the present invention other base salts of an alkanoic acid. These base salts can be alkali-earth metal salts or tertiary amine salts.

At the conclusion of the reaction, the solvent is removed under reduced pressure and the residual material treated with water and adjusted to pH 7. The product can be filtered or, alternately, can be extracted into a water-immiscible solvent such as chloroform or methylene chloride.

The starting glyoxylic acid 2-arylsemicarbazones are synthesized according to the following scheme:

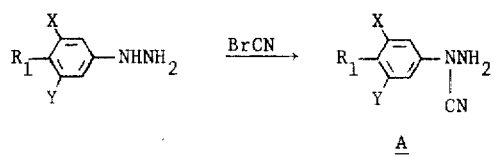

Continued

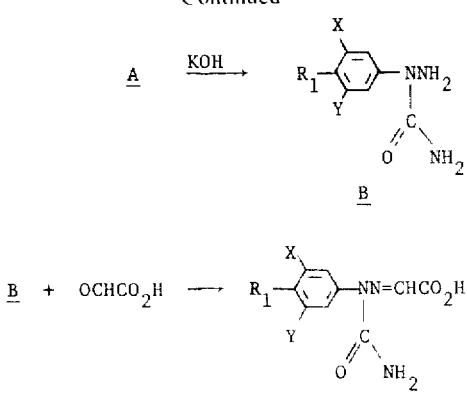

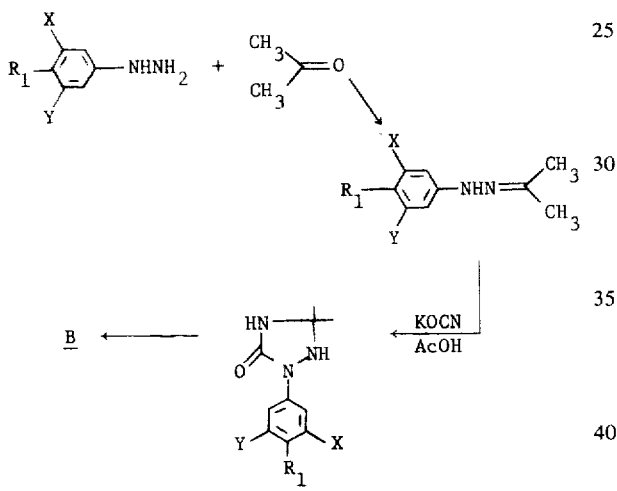

This synthetic route leading to the preparation of B is essentially that taught by Pellizzari, Gazz. Chim. Ital., 37[I], 611 (1907).

An alternate method leading to B, Schildknecht, et al., Ann. Chem., 724, 226 (1969), is depicted as follows:

The 2-substituted-as-triazine-3,5-(2H,4H)-diones of the present invention are disclosed in Belgium Pat. No. 773,583. This Belgium patent teaches how to use the triazine products in controlling coccidiosis, a protozoan infection in young poultry.

The examples which follow are given by way of illustration, and are not to be construed as limitations of this invention, many variations of which are possible within the scope and spirit thereof.

EXAMPLE 1

2-Phenyl-as-triazine-3,5(2H,4H)-dione (X, Y and $R_1$ = H)

To a mixture of 207 mg. (1 m mole) of glyoxylic acid 2-phenylsemicarbazone in 3 ml. of acetic anhydride is added 164 mg. (2 m moles) of anhydrous sodium acetate and the resulting reaction mixture heated to reflux under an atmosphere of nitrogen for 5 hrs. The solvents are removed in vacuo and residual material dissolved in sufficient 10% aqueous potassium hydroxide to provide a solution of pH 8. Following the extraction of the slightly alkaline solution with chloroform, the aqueous phase is separated, rendered acid to pH 2 with the addition of 12N hydrochloric acid and extracted with fresh chloroform. The organic layer is subsequently dried over sodium sulfate and concentrated under reduced pressure to a brown gum. The product is purified by recrystallization from ethanol, m.p. 210°–211° C. Slouka, Ber., 96, 134 (1965), reports a melting point of 213°–214° C. for this compound.

EXAMPLE 2

2-(3-Chloro-5-methylphenyl-as-triazine-3,5(2H,4H)-dione ($R_1$ = H; X = $CH_3$; Y = Cl)

In a manner similar to the procedure of Example 1, 2.55 g. (0.01 mole) of glyoxylic acid 2-(3-chloro-5-methylphenyl)semicarbazone and 1.23 g. (0.015 mole) of anhydrous sodium acetate in 35 ml. of acetic anhydride is heated under nitrogen to reflux for 6 hrs. The reaction mixture is concentrated under reduced pressure and the residue treated with 10 ml. of water and made slightly alkaline by the addition of 5% aqueous sodium hydroxide solution. The aqueous is extracted with methylene chloride, made acid with 12N hydrochloric acid and extracted with chloroform. The chloroform layer is separated, dried over sodium sulfate and concentrated to a semi-solid, which on trituration gradually solidified. The product is further purified by recrystallization from isopropanol.

EXAMPLE 3

2-(3,5-Dimethylphenyl)-as-triazine-3,5(2H,4H)-dione ($R_1$ = H; X and Y = $CH_3$)

A mixture of 470 mg. (2 m moles) of glyoxylic acid 2-(3,5-dimethylphenyl)semicarbazone and 246 mg. (3 m moles) of anhydrous sodium acetate in 5 ml. of propionic anhydride is heated under a nitrogen atmosphere to 150° C. in an oil bath. After 4 hrs. of heating, the solvents are removed in vacuo and the residue treated with 4 ml. of cold 5% aqueous sodium hydroxide. The hazy aqueous solution is extracted with chloroform and treated with sufficient 6N hydrochloric acid to provide a pH 2. The acidified solution is allowed to stir in a salt-ice bath for several hours. The resulting precipitated product is filtered, dried and recrystallized from methanol-water.

EXAMPLE 4

2-(3-Chlorophenyl)-as-triazine-3,5(2H,4H)-dione ($R_1$ and X = H; Y = Cl)

In a manner similar to that in Example 3, 98 mg. (1 m mole) of anhydrous potassium acetate is added to 4 ml. of propionic anhydride containing 241 mg. (1 m mole) of glyoxylic acid 2-(3-chlorophenyl)semicarbazone and the resulting mixture heated on a steam bath overnight. The reaction mixture is reduced in volume in vacuo and treated with 3 ml. of water. The mixture is made slightly alkaline with dilute aqueous sodium hydroxide and extracted with methylene chloride. The aqueous phase is separated, made acid with dilute sulfuric acid and extracted with fresh methylene chloride. The organic layer is separated, dried over magnesium sulfate and concentrated to dryness. The residual product is recrystallized several times from isopropanol.

EXAMPLE 5

2-(3-Chloro-5-methyl-4-[2-chlorophenoxy]phenyl)-as-triazine-3,5(2H,4H)-dione ($R_1 = 2-ClC_6H_4O-$; $X = CH_3$; $Y = Cl$)

The procedure of Example 1 is repeated, starting with 1.96 g. (0.02 mole) of anhydrous potassium acetate and 3.82 g. (0.01 mole) of glyoxylic acid 2-(3-chloro-5-methyl-4-[2-chlorophenoxy]phenylsemicarbazone in 30 ml. of acetic anhydride and a reaction time of 6.5 hrs. at reflux temperatures, to provide the desired product, which is purified by recrystallization from ethanol.

EXAMPLE 6

The following congeners are prepared according to the procedure of Example 5, starting with the requisite glyoxylic acid 2-arylsemicarbazone, anhydrous lithium propionate and acetic anhydride:

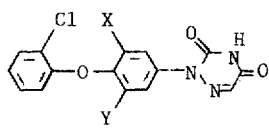

| X | Y |
|---|---|
| H | H |
| $CH_3$ | $CH_3$ |
| H | $CH_3$ |
| H | Cl |

| X | Y |
|---|---|
| H | H |
| $CH_3$ | $CH_3$ |
| H | $CH_3$ |
| H | Cl |

EXAMPLE 7

2-(3-Chloro-5-methyl-4-[2-chloro-4-N-methyl-N-ethylsulfamoylphenoxy]phenyl)-as-triazine-3,5(2H,4H)-diones ($R_1 = 2-Cl-4-CH_3(C_2H_5)NSO_2C_6H_3O-$; $X = CH_3$; $Y = Cl$)

To 20 ml. of butyric anhydride is added 1.1 g. (0.01 mole) of anhydrous sodium butyrate and 2.5 g. (5 m moles) of glyoxylic acid 2-(3-chloro-5-methyl-4-[2-chloro-4-N-methyl-N-ethylsulfamoylphenoxy]phenyl)-semicarbazone, and the resulting mixture heated under a nitrogen atmosphere at 140°C. for 4 hrs. The mixture is concentrated under reduced pressure, and the residue treated with 15 ml. of water and sufficient 10% potassium hydroxide to provide a pH 8. After extracting the slightly alkaline solution with chloroform, the aqueous layer is made acid to pH 2 and allowed to stir in an ice-bath for several hours. The resulting precipitated product is filtered, dried and recrystallized from methanol.

EXAMPLE 8

The procedure of Example 7 is repeated, starting with the requisite glyoxylic acid 2-arylsemicarbazones and the indicated alkali metal alkanoates and alkanoic acid anhydrides, to provide the following analogs:

2-(3,5-dimethyl-4-[2-chloro-4-N-methyl-N-ethylsulfamoylphenoxy]phenyl)-as-triazine-3,5(2H,4H)-dione (sodium formate; acetic anhydride); 2-(4-[2-chloro-4-N-methyl-N-ethylsulfamoylphenoxy]phenyl)-as-triazine-3,5-(2H,4H)-dione (potassium caproate; i-butyric anhydride); 2-(3-methyl-4-[2-chloro-4-N-methyl-N-ethylsulfamoylphenoxy]phenyl)-as-triazine-3,5(2H,4H)-dione (lithium formate; propionic anhydride); and 2-(3-chloro-4-[2-chloro-4-N-methyl-N-ethylsulfamoylphenoxy]phenyl-as-triazine-3,5(2H,4H)-dione (sodium i-butyrate; i-butyric anhydride).

PREPARATION A

Anilines 1.
2,2'-Dichloro-4-amino-4'-N-methyl-N-ethylsulfamoyl-6-methyldiphenyl ether 1. 2,2'-Dichloro-4-nitro-6-methyldiphenyl ether To a stirred suspension of 11.5 g. (0.293 mole) of sodium hydride in 100 ml. of dry dimethylformamide is added, under a nitrogen atmosphere, 37.5 g. (0.293 mole) of o-chlorophenol in 150 ml. of the same solvent at such a rate that the temperature does not rise above 40°C. When the evolution of hydrogen ceases, 31.0 g. (0.267 mole) of 3,4-dichloro-5-methylnitrobenzene in 70 ml. of dry dimethylformamide is rapidly added, and the resulting reaction mixture heated to 130°C. for 4 hrs. Approximately one-half the solvent is removed in vacuo and the residue poured into 4l. of ice-water. The resulting precipitate is washed successively with water, 10% potassium hydroxide solution, water and hexane. The solids are air dried and employed in subsequent reactions without further purification.

2.
2,2'-Dichloro-4-nitro-4'-chlorosulfonyl-6-methyldiphenyl ether

Twenty-five grams of 2,2'-dichloro-4-nitro-6-methyldiphenyl ether in 100 ml. of methylene chloride is treated dropwise with 48 ml. of chlorosulfonic acid and the resulting dark solution allowed to stir at room temperature overnight.

The solvent is removed under reduced pressure, and the residue added to 200 ml. of ice-water layered over with 500 ml. of diethyl ether. The organic phase is dried over sodium sulfate and concentrated to a brown solid which is slurried in hexane and filtered. The intermediate product is used without further purification.

3.
2,2'-Dichloro-4-nitro-4'-N-methyl-N-ethylsulfamoyl-6-methyldiphenyl ether

A solution of 2 g. of 2,2'-dichloro-4-nitro-4'-chlorosulfonyl-6-methyldiphenyl ether in 50 ml. of methylene chloride is treated with a solution of 2 ml. of methyl ethyl amine in 10 ml. of the same solvent. After stirring for 30 min. the solvent is removed in vacuo and the residue triturated in water. The solids are filtered, dried, and employed in the subsequent reduction reaction without further purification.

4.
2,2'-Dichloro-4-amino-4'-N-methyl-N-ethylsulfamoyl-6-methyldiphenyl ether

To a stirring solution of 2.2 g. (5 m moles) of 2,2'-dichloro-4-nitro-4'-N-methyl-N-ethylsulfamoyl-6-methyldiphenyl ether in 20 ml. of ethanol at room temperature is added dropwise a solution of 5.38 g. (4 m moles) of stannous chloride hydrate in 8.7 ml. of 12N hydrochloric acid. The resulting suspension is stirred at room temperature for 96 hrs., after which the ethanol is removed under reduced pressure and the residual material is slurried in 200 ml. of water to which is added sufficient 10% potassium hydroxide solution to provide a pH of 9. The solids, which are washed with water and then with hexane, are dried and recrystallized from isopropanol.

II.

Repeating the procedure of Preparation A–1 and 4, and starting with the requisite reagents, the following anilines not previously reported in the chemical literature are prepared:

2,2'-dichloro-4-amino-6-methyldiphenyl ether, m.p. 113°–118° C.

PREPARATION B

Hydrazines

The following hydrazines are synthesized from the corresponding anilines employing the procedure as taught in "Organic Synthesis", John Wiley & Sons, Inc., New York, N.Y., 1941, Coll. Vol. I, p. 442, which comprises diazotization of the requisite aniline followed by reduction of the diazonium salt with sodium sulfite:

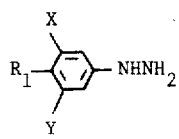

| $R_1$ | X | Y |
|---|---|---|
| H | H | H |
| H | $CH_3$ | Cl |
| H | $CH_3$ | $CH_3$ |
| H | H | Cl |
| H | H | $CH_3$ |
| 2—$ClC_6H_4O$— | $CH_3$ | Cl |
| 2—$ClC_6H_4O$— | H | H |
| 2—$ClC_6H_4O$— | $CH_3$ | $CH_3$ |
| 2—$ClC_6H_4O$— | H | $CH_3$ |
| 2—$ClC_6H_4O$— | H | Cl |
| 2—Cl—4—$(CH_3)C_2H_5NSO_2C_6H_3O$— | $CH_3$ | Cl |
| 2—Cl—4—$(CH_3)C_2H_5NSO_2C_6H_3O$— | $CH_3$ | $CH_3$ |
| 2—Cl—4—$(CH_3)C_2H_5NSO_2C_6H_3O$— | $CH_3$ | H |
| 2—Cl—4—$(CH_3)C_2H_5NSO_2C_6H_3O$— | H | H |
| 2—Cl—4—$(CH_3)C_2H_5NSO_2C_6H_3O$— | H | Cl |

PREPARATION C

Cyanohydrazines

I. 1-Phenyl-1-cyanohydrazine

A solution of 81.5 g. (0.7 mole) of cyanogen bromide in 500 ml. of ethanol is added slowly with stirring to 2.5 l. of water, followed by the addition of 75.1 ml. (0.7 mole) of phenylhydrazine. The resulting reaction mixture is stirred for 1.5 hrs. at room temperature during which time a precipitate forms. The intermediate product is filtered and dried, 12.5 g., m.p. 87°–88° C. Additional amounts of the desired product are obtained by concentration of the filtrate followed by cooling, 24.5 g.

II.

Starting with the appropriate hydrazine and cyanogen bromide and following the procedure of Preparation C–I, the following intermediate congeners are prepared:

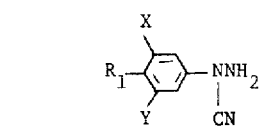

| $R_1$ | X | Y |
|---|---|---|
| H | $CH_3$ | Cl |
| H | $CH_3$ | $CH_3$ |
| H | H | Cl |
| H | H | $CH_3$ |
| 2—$ClC_6H_4O$— | $CH_3$ | Cl |
| 2—$ClC_6H_4O$— | H | H |
| 2—$ClC_6H_4O$— | $CH_3$ | $CH_3$ |
| 2—$ClC_6H_4O$— | H | $CH_3$ |
| 2—$ClC_6H_4O$— | H | Cl |
| 2—Cl—4—$(CH_3)C_2H_5NSO_2C_6H_3O$— | $CH_3$ | Cl |
| 2—Cl—4—$(CH_3)C_2H_5NSO_2C_6H_3O$— | $CH_3$ | $CH_3$ |
| 2—Cl—4—$(CH_3)C_2H_5NSO_2C_6H_3O$— | H | H |
| 2—Cl—4—$(CH_3)C_2H_5NSO_2C_6H_3O$— | $CH_3$ | H |
| 2—Cl—4—$(CH_3)C_2H_5NSO_2C_6H_3O$— | H | Cl |

PREPARATION D

Semicarbazides

I. 2-Phenylsemicarbazide

A slurry of 12.5 g. (0.09 mole) of 1-cyano-1-phenylhydrazine in 65 ml. of water containing 6.5 g. of potassium hydroxide is heated gently on a steam bath until a solution is effected. The solution is allowed to cool with stirring, and the resulting precipitated product filtered and dried, 9.0 g., m.p. 121°–123° C.

II.

Starting with the requisite 1-cyano-1-arylhydrazine and following the procedure of Preparation D-I, the following semicarbazides are formed:

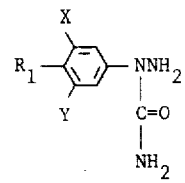

| $R_1$ | X | Y |
|---|---|---|
| H | $CH_3$ | Cl |
| H | $CH_3$ | $CH_3$ |
| H | H | Cl |
| H | H | $CH_3$ |
| 2—$ClC_6H_4O$— | $CH_3$ | Cl |
| 2—$ClC_6H_4O$— | H | H |
| 2—$ClC_6H_4O$— | $CH_3$ | $CH_3$ |
| 2—$ClC_6H_4O$— | H | $CH_3$ |
| 2—$ClC_6H_4O$— | H | Cl |
| 2—Cl—4—$(CH_3)C_2H_5NSO_2C_6H_3O$— | $CH_3$ | Cl |
| 2—Cl—4—$(CH_3)C_2H_5NSO_2C_6H_3O$— | $CH_3$ | $CH_3$ |
| 2—Cl—4—$(CH_3)C_2H_5NSO_2C_6H_3O$— | H | H |
| 2—Cl—4—$(CH_3)C_2H_5NSO_2C_6H_3O$— | $CH_3$ | H |
| 2—Cl—4—$(CH_3)C_2H_5NSO_2C_6H_3O$— | H | Cl |

PREPARATION E

Semicarbazones

I. Glyoxylic acid 2-phenylsemicarbazone

A solution of 2.9 g. (0.033 mole) of glyoxylic acid in 10 ml. of water is added dropwise into a solution of 15 ml. of 10% hydrochloric acid containing 4.53 g. (0.03 mole) of 2-phenylsemicarbazide. After stirring for 10 min. the resulting precipitate is filtered and dried, 6.19 g., m.p. 194° C. (dec.). The intermediate is further purified by recrystallization from ethanol-water, m.p. 195° C. (dec.).

II.

Repeating the above procedure of Preparation E–I, and starting with requisite hydrazines and glyoxylic acid, the following intermediates are prepared:

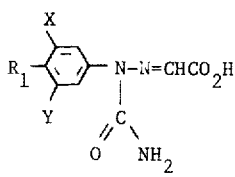

| $R_1$ | X | Y |
| --- | --- | --- |
| H | $CH_3$ | Cl |
| H | $CH_3$ | $CH_3$ |
| H | H | Cl |
| H | H | $CH_3$ |
| 2—$ClC_6H_4O$— | $CH_3$ | Cl |
| 2—$ClC_6H_4O$— | H | H |
| 2—$ClC_6H_4O$— | $CH_3$ | $CH_3$ |
| 2—$ClC_6H_4O$— | H | $CH_3$ |
| 2—$ClC_6H_4O$— | H | Cl |
| 2—Cl—4—$(CH_3)C_2H_5NSO_2C_6H_3O$— | $CH_3$ | Cl |
| 2—Cl—4—$(CH_3)C_2H_5NSO_2C_6H_3O$— | $CH_3$ | $CH_3$ |
| 2—Cl—4—$(CH_3)C_2H_5NSO_2C_6H_3O$— | H | H |
| 2—Cl—4—$(CH_3)C_2H_5NSO_2C_6H_3O$— | $CH_3$ | H |
| 2—Cl—4—$(CH_3)C_2H_5NSO_2C_6H_3O$— | H | Cl |

What is claimed is:

1. A process for the preparation of a compound of the formula

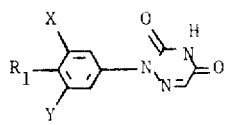

wherein X is selected from the group consisting of hydrogen and methyl;

Y is selected from the group consisting of hydrogen, methyl and chloro; and $R_1$ is selected from the group consisting of hydrogen, 2-chlorophenoxy and 2-chloro-4-(N-methyl-N-ethylsulfamoyl)phenoxy, which comprises contacting a compound of the formula

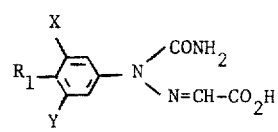

with an equimolar amount of an alkali metal salt of an alkanoic acid containing from 2 to 5 carbon atoms and an equimolar amount of an alkanoic acid anhydride containing from 4 to 8 carbon atoms at 75°–150° C. in a reaction-inert solvent.

2. The process of claim 1 wherein the alkali metal salt of the alkanoic acid is sodium acetate and the alkanoic acid anhydride is acetic anhydride.

3. The process of claim 2 wherein X and Y are each methyl and $R_1$ is hydrogen.

4. The process of claim 2 wherein X, Y and $R_1$ are each hydrogen.

5. The process of claim 2 wherein X is methyl and Y is chloro.

6. The process of claim 5 wherein $R_1$ is hydrogen.

7. The process of claim 5 wherein $R_1$ is 2-chlorophenoxy.

8. The process of claim 5 wherein $R_1$ is 2-chloro-4-(N-methyl-N-ethylsulfamoyl)phenoxy.

* * * * *